Patented Sept. 25, 1945

2,385,471

UNITED STATES PATENT OFFICE 2,385,471

COLORIMETRIC METHOD FOR TESTING FOR AVAILABLE CHLORINE

Harry Scharer, Brooklyn, N. Y.

No Drawing. Application July 17, 1941,
Serial No. 402,846

4 Claims. (Cl. 23—230)

This invention relates to a colorimeter method for testing for available chlorine and is based on the use of a diamino diphenyl compound, which, in the presence of available chlorine and under controlled pH conditions, gives rise to a series of well defined colors having a direct relationship to the amount of chlorine present.

Heretofore, the most commonly used colorimetric tests for chlorine in the dilutions normally required for bacteriocidal or sterilizing solutions are those tests which give rise to a color, the intensity of which varies with the degree or amount of chlorine present and therefore requires, even for rough approximations of the chlorine concentration, a series of color standards to properly evaluate the result of the test. The most commonly used test, the o-tolidine test, yields a yellow color progressing in intensity with the amount of chlorine present. Such yellow colors are notoriously difficult to match against standards (using the naked eye), particularly under artificial light; consequently, a determination of the concentration or amount of chlorine present is frequently difficult and often only approximately correct, subject to considerable error dependent on the individual idiosyncrasy in matching the yellow color resulting from the test against a series of yellow color standards; or even in determining whether the yellow color resulting from the test is weaker, equal to or greater than a particular yellow color standard.

It is an object of the invention to provide a simple, rapid and convenient test for determining the concentration of a chlorine containing solution, the application of the test resulting in the formation of a series of distinct colors; for example, blue, green, yellow, orange and red, as opposed to shades or intensities of a single color, such distinct colors being readily differentiated from each other and bearing a direct and progressive relationship to the amount of available chlorine present in the quantity of chlorine containing solution which is required for testing purposes.

The method followed in testing a chlorine solution takes advantage of certain chemical properties of diaminodiphenyl compounds. Such diaminodiphenyl compounds are oxidized by chlorine to give partially oxidized products known as meriquinones, and more fully oxidized products termed holoquinones. In the presence of excess acid (low pH) the formation of the holoquinone is favored and this is true whether or not the amount of the diaminodiphenyl compound is present in excess of that quantity which theoretically can be completely oxidized by the amount of chlorine present. To more fully explain the chemistry of this invention, one diaminodiphenyl compound, namely, 3,3′ dimethylbenzidine, is considered in detail, although it is not intended to restrict the scope of this invention to that one compound.

The meriquinone of 3,3′ dimethylbenzidine (also known as orthotolidine) is blue, while the holoquinone is yellow. Under the conditions stated above (excess acid), the formation of the yellow color is favored. This factor influenced the conditions prescribed for the ortho tolidine test for chlorine most commonly in use. It had also been observed that variations in color of the ortho tolidine test commonly used were due to the superimposing of different degrees of oxidation upon the effects of variable pH, in that if the amounts of ortho tolidine and chlorine were constant, the color varied progressively from yellow to green to blue as the numerical pH increased from pH 1 to about pH 4. These observations apparently justified the assumption that the oxidation product was a pH indicator having a range from 2.0 to 4.0 with a color change from yellow to blue.

Whether or not this be true, I have made the discovery that if the pH of the reaction mixture of ortho tolidine and chlorine be maintained at some point between 3.0 and 5.5, as for example 4.0, then the oxidation products which result from such reaction mixture bear a definite relationship to the ratio of the ortho tolidine to the chlorine; and that, if the amount of ortho tolidine be constant throughout a series of tests and be gravimetrically greater than the amount of chlorine present in the quantity of chlorine containing liquid taken for testing purposes, then the particular color which is formed through the reaction is dependent upon the quantity or amount of chlorine present, in that the conditions initially favor the formation of the partially oxidized blue product, but as the ratio of ortho tolidine to chlorine is decreased by the presence of a higher chlorine concentration, then the formation of the yellow colored completely oxidized product is obtained. Intermediate ratios between the stoichiometric quantities of ortho tolidine and chlorine required for partial (or initial) oxidation on the one hand, and complete oxidation on the other hand, result in combinations of blue and yellow colors yielding green colors. When the ratio of ortho tolidine to chlorine exceeds the stoichiometric proportions required for complete oxidation of the ortho tolidine, red colors are formed, and orange colors are formed by quantities of chlorine intermediate the amount required to give yellow and the amount required to give red.

It will be noted that for the test herein described three constituents are necessary; a chlorine containing solution to be tested, a buffer, and a reagent which is capable of being oxidized to form a colored meriquinone, and a different colored holoquinone. If, for example, a buffer of pH 4.0 be employed, it must have sufficient buffering capacity to maintain this pH approximately under the varying degrees of alkalinity encountered in chlorine containing solutions, and should be compatible with the test reagent in that it should not cause decomposition or precipitation of the test reagent or prevent the formation of the previously described colors.

In making the test in a preferred form the following illustrative procedure is followed: the aliquot of chlorine solution taken for testing purposes is regulated by the supposed or required strength of the chlorine containing solution. By means of a calibrated pipette or any other regulating means, a portion of the chlorine containing solution is taken, such that the approximate gravimetric quantity of 100 gamma of available chlorine is present as judged by the presumed or required concentration. Water is then added so as to dilute the sample to a uniform level. A predetermined quantity of buffer is then added, the mixture shaken, and finally the test reagent is added and the mixture shaken briefly again. The color forms rapidly, usually within thirty seconds, and is stable for a considerable period. While it is preferable to add the buffer before the reagent, the two may be added together by the preparation of a solution containing both the buffer and the reagent. The quantity of reagent which is added per test is regulated by the molecular weight of the reagent and the gravimetric relationship between the reagent and chlorine. If, for example, the reagent is 3,3′ dimethyl, 4,4′ diamino diphenyl-dihydrochloride, then the solution of the reagent should be such that a quantity containing 350 gamma of the reagent can be readily measured, and this quantity is taken for each test.

Under the conditions previously described, when the chlorine containing solution is at the concentration tested for, a yellow color is obtained. If the chlorine containing solution is stronger than the previously presumed strength tested for, an orange or reddish color is obtained, and if it be weaker a blue or green color is obtained. This is true regardless of what concentration is tested for, since an aliquot is taken such that 100 gamma of chlorine will be present and the yellow color will be formed when that quantity is in fact present and the orange or red colors will be formed when more than that quantity is present whereas the blue or green colors will be formed when less than that quantity is present.

While in the preferred example given, 100 gamma of chlorine was suggested for testing purposes, it is not intended to restrict the scope of this invention to this one quantity since standardization of the test could be made by using a greater or smaller quantity of chlorine and correspondingly a greater or smaller quantity of color forming reagent as long as the gravimetric relationship between the quantity of chlorine and the quantity of reagent be substantially the same. Nor is the scope of the invention limited to the production of a yellow color when the proper concentration of chlorine is encountered since by changing the aliquot or altering the predicated ratio between the chlorine and the reagent, the production of any of the other stated colors could be deemed the "proper" or acceptable color and the evaluation of the other colors reinterpreted on the basis of this color.

While a specific reagent has been set forth above, the reagent generally should be of the formula

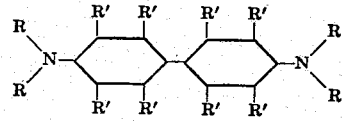

and addition acid salts of the same in which R represents monovalent radicals selected from the class consisting of hydrogen, hydroxy, aryl, alkyl, alkaryl, halogen, arylalkyl, and R′ represents the same groups as R with the addition of acid radicals including sulfonic; the reagent being of such a nature that oxidation by chlorine will result in the formation of a quinone structure.

In order accurately to use the color test, the following color standards are very satisfactory: Using solutions containing known amounts of available chlorine, the four colors are developed, and sheets of cellulose acetate, obtainable in many colors, are matched with the exact shade of blue, green, yellow and orange thus obtained. These colored sheets are corked up in test tubes in pure water. These color standards are held up to the light alongside the unknowns being tested and thus a very accurate color comparison made.

The method of testing here involved is particularly useful for testing for available chlorine in rinsing and sterilizing solutions, as used in the dairy or restaurant industry, for example, involving concentrations of available chlorine varying from 10 to 500 P. P. M. Such solutions are usually hypochlorite solutions. However, the test can be used for testing for available chlorine in chloramine solutions, although with such solutions the color formation is slower.

The present invention is based on the fact that the available chlorine oxidizes the reagent through successive stages under the prescribed pH conditions and it is therefore important that the buffer have sufficient capacity to maintain a pH between 3 and 5, the preferred pH being about 4. This pH condition is of importance in obtaining the most brilliant and contrasting and fairly lasting colors. In practice the reagent may be combined with a buffer of, say, acetic acid and sodium acetate to give the desired pH.

*Preparation of reagent*

The reagent used (as one specific example) is prepared by taking 35 mg. of pure ortho-tolidine dihydrochloride crystals and dissolving them in 50 cc. of a buffer solution. A buffer solution may be prepared by dissolving 15 cc. of glacial acetic acid in 100 cc. of distilled water. To this is added 6.8 grams of sodium acetate crystals and shaken until dissolved. When so prepared ½ cc. of the reagent is used for each test as described above. The reagent should be stored in a light-proof bottle and protected from direct sunlight and should be freshly prepared every week or two. The purer the o-tolidine the greater the stability of the reagent. If desired a preservative may be added to enhance the stability of the reagent. The preservative may be a salt or an ester of a hydroxy benzoate or a propionate.

The reagent and buffer have heretofore been referred to as in solution. However, it is feasible and very convenient to have the reagent and buffer combined in tablet form in the dry state. Such tablets are prepared to contain the proper amounts of buffer and reagent so that when dissolved in a definite amount of water the proper strength solution as heretofore set forth will be obtained.

I claim:

1. A process for testing for available chlorine which consists of taking of each solution to be tested an aliquot containing an approximate gravimetric quantity of chlorine as judged by the presumed or required strength, and, in the presence of a compatible buffer solution of pH 3.0 to 5.0, reacting said chlorine aliquot with a solution of a definite gravimetric quantity of a diamino diphenyl compound to act as a color reagent, selected from the class represented by the formula

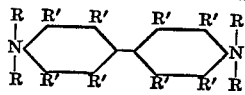

and acid addition salts thereof in which R represents monovalent radicals selected from the class consisting of hydrogen, hydroxyl, aryl, alkyl, alkaryl, arylalkyl, halogen, and R' represents the same groups as R with the addition of monovalent acid radicals, the color reagent being of such nature that oxidation by chlorine will result in the formation of a colored meriquinone and a diversely colored holoquinone; said gravimetric quantity of color reagent being of such stoichiometric relationship to the theoretical amount of chlorine present in the aliquot as to yield the fully oxidized yellow holoquinone; so that if less chlorine be actually present in the aliquot than the theorized amount, such state will be indicated by the formation of the diversely colored, partially oxidized meriquinone blue or green colors, and if more chlorine be present than the theorized amount orange or red colors will result, but if the theorized amount of chlorine be present a yellow color indicative of complete oxidation is obtained, thus affording a quantitative estimation, by comparison with a calibrated color chart, of the amount of chlorine present.

2. A process for testing for available chlorine which consists of taking of each solution to be tested an aliquot containing an approximate gravimetric quantity of chlorine as judged by the presumed or required strength, and, in the presence of a compatible buffer solution of pH 3.0 to 5.0, reacting said chlorine aliquot with a solution of a definite gravimetric quantity of 3,3' dimethyl, 4,4' diamino diphenyl-dihydrochloride to act as a color reagent, the color reagent being of such a nature that oxidation by chlorine will result in the formation of a colored meriquinone and a diversely colored holoquinone; said gravimetric quantity of color reagent being of such stoichiometric relationship to the theoretical amount of chlorine present in the aliquot as to yield the fully oxidized yellow holoquinone, so that if less chlorine be actually present in the aliquot than the theorized amount, such state will be indicated by the formation of the diversely colored, partially oxidized meriquinone blue or green colors, and if more chlorine be present than the theorized amount orange or red colors will result, thus affording a quantitative estimation, by comparison with a calibrated color chart, of the amount of chlorine present.

3. The method of testing solutions for available chlorine which comprises treating a substantially definite gravimetric quantity of dissolved chlorine, in the presence of a buffer of pH 3.0 to 5.0, with a definite amount of a diaminodiphenyl compound of the class

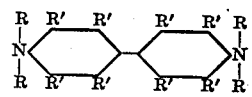

and acid addition salts thereof in which R represents monovalent radicals selected from the class consisting of hydrogen, hydroxyl, aryl, alkyl, alkaryl, arylalkyl, halogen, and R' represents the same groups as R with the addition of monovalent acid radicals, said amount of diaminodiphenyl compound being molecularly equivalent to the theoretical amount of chlorine used, and estimating the available chlorine present by the particular color of a possible series of diverse colors resulting from partial or complete oxidation of the color reagent, said colors bearing a direct and progressive relationship in the order of the spectrum to the amount of chlorine present.

4. A chlorine test reaction unit in dry form containing a definite amount of a fixed proportion of a diaminodiphenyl compound selected from the class

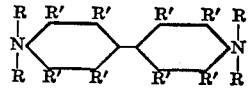

and acid addition salts thereof in which R represents monovalent radicals selected from the class consisting of hydrogen, hydroxyl, aryl, alkyl, alkaryl, arylalkyl, halogen, and R' represents the same groups as R with the addition of monovalent acid radicals, and compatible buffering mixture sufficient to maintain a pH at some point between about 3.0 to about 5.0 when dissolved in water.

HARRY SCHARER.